United States Patent

Takeoka

[11] Patent Number: 5,409,963
[45] Date of Patent: Apr. 25, 1995

[54] CURABLE SILICONE COMPOSITION

[75] Inventor: Toru Takeoka, Cincinnati, Ohio

[73] Assignee: Three Bond Co., Ltd., Tokyo, Japan

[21] Appl. No.: 174,239

[22] Filed: Dec. 28, 1993

[51] Int. Cl.$^6$ ................................................ C08F 2/46
[52] U.S. Cl. ........................................ 522/31; 522/32;
524/266; 524/268; 524/588; 528/15; 528/17;
528/32; 528/34
[58] Field of Search ............... 522/31, 32; 524/266,
524/268, 588; 528/15, 17, 32, 34

[56] References Cited

U.S. PATENT DOCUMENTS

| | | | |
|---|---|---|---|
| 4,528,081 | 7/1985 | Lien et al. | |
| 4,640,967 | 2/1987 | Eckberg et al. | 528/15 |
| 4,675,346 | 6/1987 | Lin et al. | |
| 4,882,201 | 11/1989 | Crivello et al. | 522/25 |
| 4,921,880 | 5/1990 | Lee et al. | 522/12 |
| 4,921,926 | 5/1990 | Motegi et al. | 528/17 |
| 5,091,483 | 2/1992 | Mazurek et al. | 525/477 |
| 5,240,971 | 8/1993 | Eckberg et al. | 528/15 |
| 5,292,849 | 3/1994 | Fujioka et al. | 528/34 |

*Primary Examiner*—John C. Bleutge
*Assistant Examiner*—Mark D. Sweet
*Attorney, Agent, or Firm*—Scully, Scott, Murphy & Presser

[57] ABSTRACT

A silicone composition capable of being cured by both a moisture-curing mechanism and an ultraviolet (UV) curing mechanism is provided. The silicone composition comprises:

① a reactive organosiloxane prepared by a condensation reaction of a silicone (1) represented by the general formula

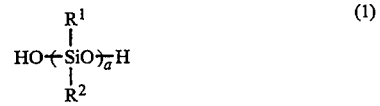

where $R^1$ and $R^2$ are each an organo group, and a is a number corresponding to a kinematic viscosity of 25–50,000 cSt, measured at 25° C., with a vinyl ether silane compound represented by the general formula:

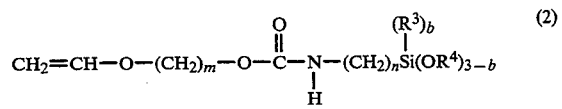

where m and n are each an integer of 1 to 5, $R^3$ and $R^4$ are each an alkyl group having 1 to 3 carbon atoms or allyl, and b is 0 or 1;

② 0–70 parts by weight of a silicone oil having trimethylsilyl group as an end group;

③ a catalytic amount of a photopolymerization catalyst; and

④ a catalytic amount of a silicone moisture-curing catalyst.

4 Claims, 2 Drawing Sheets

CURABLE SILICONE COMPOSITION

BACKGROUND OF THE INVENTION

The present invention relates to an organopolysiloxane composition capable of curing into a highly flexible rubbery elastomer upon exposure to ultraviolet light and having a moisture curing function in a shaded place where ultraviolet light does not reach.

Heretofore, curable silicone compositions have been used in various industrial fields because of their various superior characteristics. However, many of them are a heat-curing type, a type of curing at room temperature upon standing for a long time, or a two-pack type, and problems have been encountered in their curing time and working efficiency. For solving these problems, various studies have heretofore been made about a silicone polymer with a certain photosensitive group introduced therein for curing upon radiation of light such as ultraviolet light thereto or about a composition containing such polymer. However, the photocurable silicone polymers or compositions which are presently known involve problems; for example, a photocuring reaction does not always proceed at a sufficiently high speed, or their curing mechanism is apt to be impaired by the oxygen in air. Further, in a shaded place where light such as ultraviolet light cannot reach, there remains an uncured portion.

Accordingly, it is the object of the present invention to provide a novel photocurable organopolysiloxane composition free of the above-mentioned problems encountered in the prior art.

SUMMARY OF THE INVENTION

The present invention resides in a composition capable of being cured by both a moisture-curing mechanism and an ultraviolet (UV)-curing mechanism and comprising:

① 30–100 parts by weight of a reactive organosiloxane, the said reactive organosiloxane being obtained by a condensation reaction of a silicone (1) represented by the following general formula, having a viscosity of 50 to 50,000 cSt:

(1)

where $R^1$ and $R^2$ are each an organo group, provided $R^1$ and $R^2$ are not crosslinked in excess of 2% under an ultraviolet (UV) or moisture curing condition with a vinyl ether silane compound (2) represented by the following general formula:

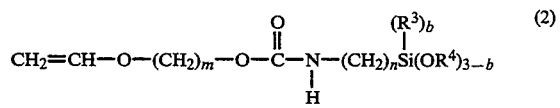

(2)

where m and n are each an integer of 1 to 5, $R^3$ and $R^4$ are each an alkyl group having 1 to 3 carbon atoms or allyl, and b is 0 or 1;

② 0–70 parts by weight of a silicone oil containing trimethylsilyl end groups;

③ a catalytic amount of a photopolymerization catalyst; and

④ a catalytic amount of a silicone moisture-curing catalyst.

DETAILED DESCRIPTION OF THE INVENTION

The reactive organosiloxane used in the composition of the present invention is obtained by a condensation reaction of the silanol and group-containing silicone (1) of the foregoing general formula (1) and the vinyl ether silane compound (2) of the foregoing general formula (2). This reaction is usually carried out by contacting the compounds (1) and (2) with each other at a molar ratio of (2) to (1) in the range from 2:1 to 6:1 in the presence of a condensation catalyst.

$R^1$ and $R^2$ in the general formula (1) are not specially limited if only they are organo groups, but unsubstituted or substituted monovalent hydrocarbon groups having 1 to 10, preferably 1 to 6 carbon atoms are preferred such as alkyl groups, e.g. methyl, ethyl, propyl, butyl, cycloalkyl groups, e.g. cyclohexyl, alkenyl groups, e.g. vinyl, allyl, aryl groups, e.g. phenyl, tolyl, as well as those obtained by substituting a portion or the whole of hydrdogen atoms attached to carbon atoms in the above groups with halogen atoms or cyano, e.g. chloromethyl, trifluoropropyl, cyanoethyl. In the same formula, a is a number selected so that the viscosity of this diorganopolysiloxane is in the range of 25 to 50,000 cSt at 25° C., preferably an integer of 10 or more.

The vinyl ether silane compound of the general formula (2) can be prepared by the reaction of a hydroxyvinyl ether and an isocyanatosilane, as shown in the following formula:

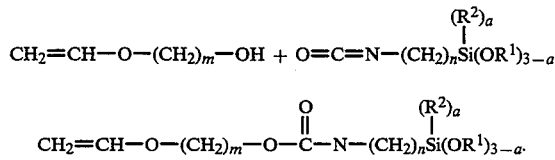

The silicone oil (polydimethylsiloxane) having trimethylsilyl group as an end group, used in the composition of the present invention, preferably has a viscosity of 50 to 5,000 cSt. As a diluent for improving the handleability of the curing material, the oil in question may be used in a proportion of 0–70, preferably 5–60, parts by weight based on 100 parts by weight of the reactive silicone oil composition for adjusting the softness of cured product.

The photopolymerization catalyst used in the present invention is a cationic photopolymerization initiator, and an onium compound is preferred. Cationic photopolymerization initiators employable in the invention are those known heretofore. Examples are aromatic sulfonium salts, aromatic diazonium salts and aromatic halonium salts. As preferred examples there are mentioned allylphenyl-iodium-hexafluoroantimonate salt (UV-9310C, a product of GE Co.) and triallylsulfonium-hexafluoroantimonate salt (CYRACURE UV6974, a product of UCC).

The amount of the cationic photopolymerization catalyst is preferably in the range of 0.001 to 10 parts by weight based on 100 parts by weight of component ①.

The silicone moisture-curing catalyst used in the present invention is a polycondensation accelerator, and a known moisture-curing catalyst is employable. Examples are metallic salts of organocarboxylic acids such as lead-2-ethyl octoate, dibutyltin diacetate, dibutyltin dilaurate, butyltin tri-2-ethylhexoate, iron-2-ethylhexoate, cobalt-2-thylhexoate, manganese-2-ethylhexoate, zinc-2-ethylhexoate, stanous caprilate, titanium naphthenate, zinc naphthenate, cobalt naphthenate and zinc stearate, organotin compounds such as dibutyltin dimethoxide, organic titanic acid esters such as tetrabutyl titanate and tetra-2-ethylhexyl titanate, organotitanium compounds such as organosiloxytitanium and $\beta$-carbonyltitanium, and alkoxyaluminum compounds, with dibutyltin dimethoxide and dibutyltin dilaurate being preferred.

The amount of the moisture-curing catalyst to be added is preferably in the range of 0.1 to 5 parts by weight based on 100 parts by weight of component ①.

In the photocurable rubbery elastomer composition of the present invention there may be incorporated other components for the purpose of modification and thereby adapting the characteristics of the composition before or after curing to various uses. Fillers generally used for silicone, e.g. fumed silica, calcined silica, precipitated silica, carbon black, calcium carbonate, diatomaceous earth and iron oxide, may be added as long as they do not impair the photocurability of the composition. A bonding accelerator, a diluent and a preservation stabilizer are also employable.

Since the cationic photopolymerization initiator and the moisture-curing agent (polycondensation accelerator) are used, the photocurable rubbery elastomer composition of the present invention cures rapidly upon exposure to electron beam such as ultraviolet ray, and even in a shaded place where light cannot reach, it exhibits a satisfactory curing performance. Thus, the composition of the invention has a wide variety of uses capable of replacing the conventional silicone resins.

EXAMPLES

Working examples of the present invention will be described below.

Example 1

116 g of hydroxybutyl vinyl ether (RAPI-CURE HBVE MONOMER, a product of GAF CHEMICALS CORPORATION) and 247 g of isocyanatopropyltriethoxysilane (A-1310, a product of UNION CARBIDE CORP.) were placed in a reactor, and after purging the interior of the reactor with nitrogen gas, 0.05 g of dibutyltin dilaurate was dropwise added slowly with stirring. Thereafter, the reaction solution temperature rose in several minutes and up to 60° C. in about 30 minutes. Thereafter, in about 3 hours, the reaction temperature began to drop gradually, and after 6 hours, it dropped to room temperature.

After the end of the reaction, the product obtained was subjected to FT-IR analysis to make sure that it was the following object product:

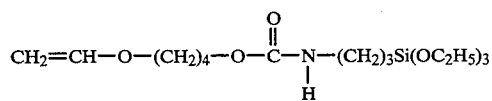

(3)

FIG. 1 shows an infrared absorption spectrum thereof.

Example 2

69.1 g of the product (3) obtained in example 1 and 200 g of an organopolysiloxane oil (SFR-100, a product of PPG Co.) having hydroxyl groups at both ends of its molecular chain and having a viscosity of 100 cSt were placed in a reactor, then the interior of the reactor was purged with nitrogen gas, and stirring was conducted in vacuum while the temperature was held at 80° C. The stirring was continued for 2 hours at the same temperature, then heating was stopped, allowing the reactor temperature to drop to room temperature to complete the reaction. The reaction product proved to be the following product:

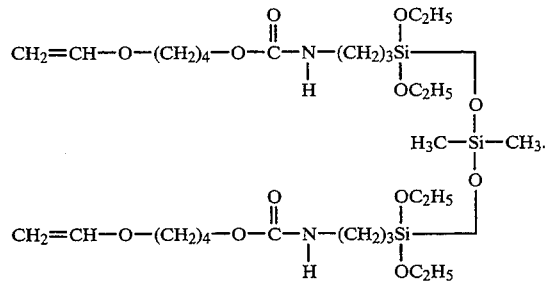

The viscosity of the product was 250 cP at 25° C. FIG. 2 shows an infrared absorption spectrum thereof.

Further, for confirming the photocuring performance of the vinyl ether group, 0.5 g of allylphenyl-iodium-hexafluoroantimonate salt (UV-931OC, a product of GE Co.) was added as a cationic photopolymerization initiator to 50 g of the product (4), followed by mixing under stirring. This composition was then applied onto an iron plate having a width of 50 mm, a length of 50 mm and a thickness of 1 mm to a thickness of about 0.1-0.5 mm, and ultraviolet light was radiated to the thus-coated iron plate for 30 seconds using a high-pressure mercury vapor lamp having an illuminance of 100 mw/cm². As a result, the composition was cured into an elastomeric film.

Example 3

To the product (4) obtained in Example 2 were added 6 g of fumed silica powder (R972, a product of Degussa Inc.) and 0.8 g of allyphenyliodium-hexafluoroantimonate salt (UV-931OC, a product of GE Co.) as a cationic photopolymerization initiator, followed by mixing under stirring. This composition was then applied onto a polyethylene mold having a width of 50 mm, a length of 150 mm and a thickness of 2 mm to a thickness of about 2 mm, and ultraviolet light was radiated to the thus-coated polyethylene mold for 30 seconds using a high-pressure mercury vapor lamp having an illuminance of 100 mw/cm², followed by standing one week in a standard state (23±2° C., 55% RH), allowing the composition to be cured.

Example 4

The polydimethylsiloxane oil used in Example 2 was replaced with one having a viscosity of 3,500 cSt (SFR-3500, a product of PPG Co.), and this 3,500 cSt polydimethylsiloxane oil and the product (3) obtained in Example 1 were reacted together in accordance with the operating method described in Example 2. Curing was allowed to proceed in the same manner as in Example 3.

Physical properties of the products obtained in Examples 3 and 4 are as shown in table below.

TABLE 1

|  | Example-3 | Example-4 |
|---|---|---|
| Shore A Hardness | 50 | 48 |
| Elongation % | 30 | 80 |
| Tensile Strength kg/cm$^2$ | 6.0 | 10.5 |

Figure 1:
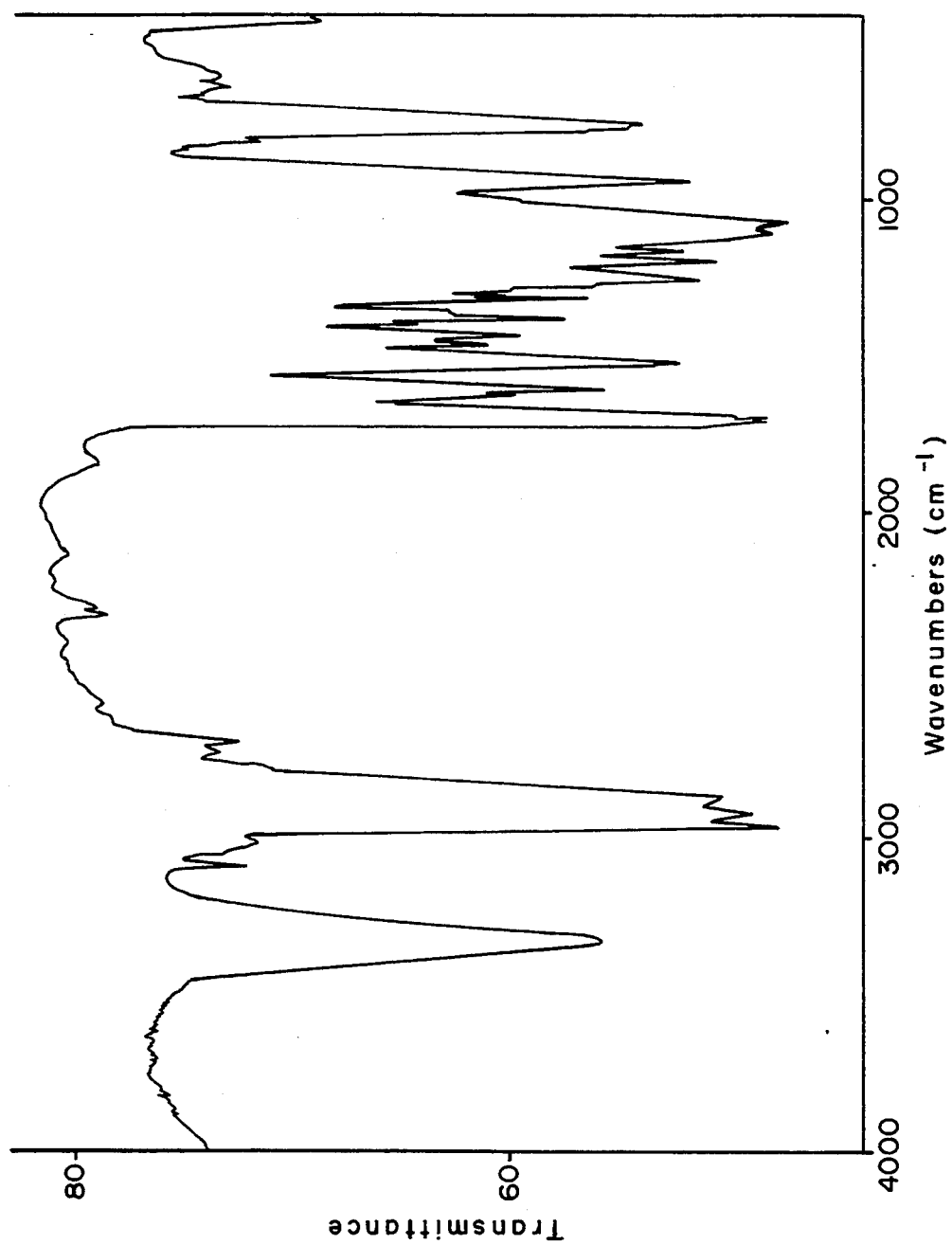
FIG. 1 shows an infrared absorption spectrum of the product obtained in Example 1.
Figure 2:
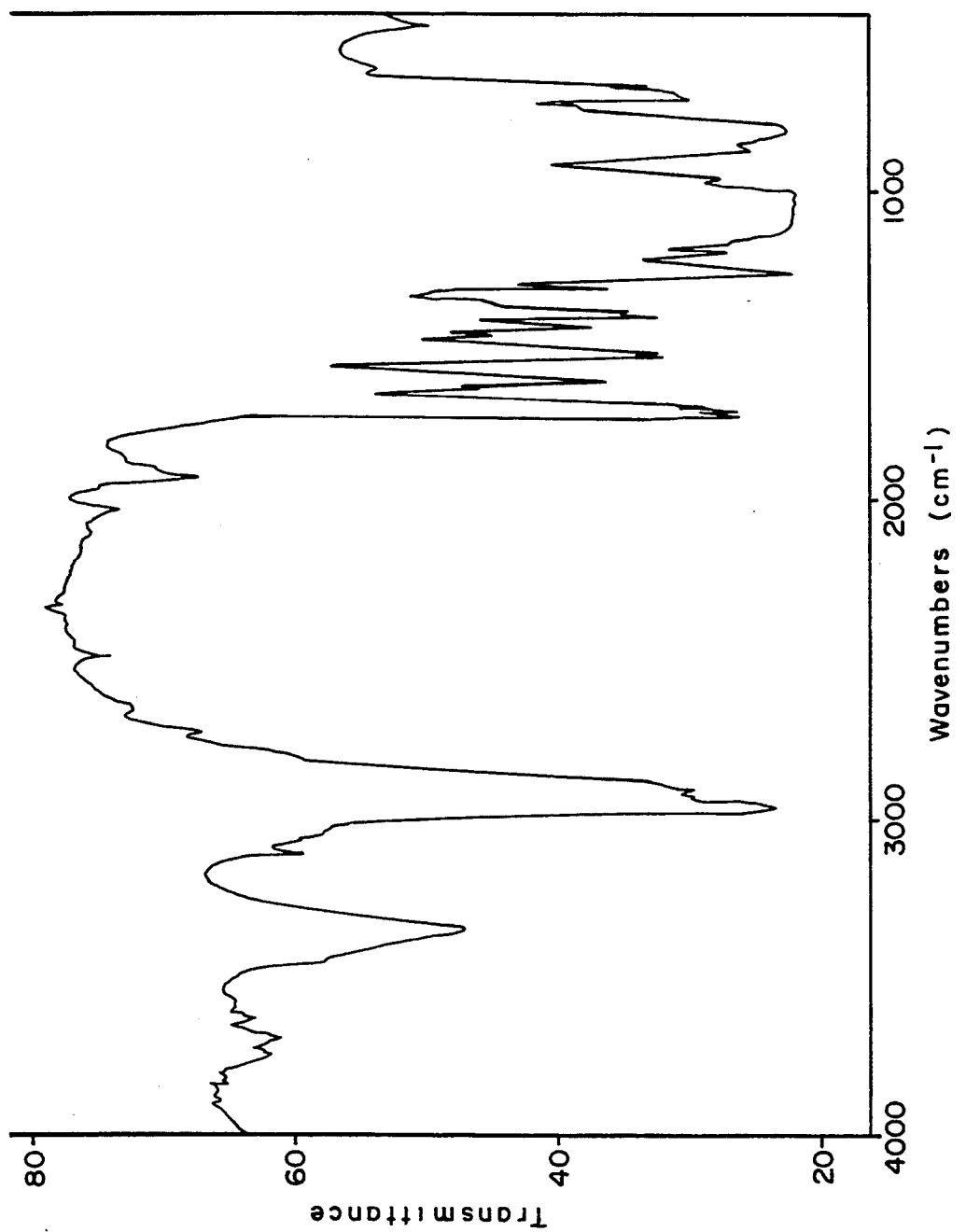
FIG. 2 shows an infrared absorption spectrum of the product obtained in Example 2.

What is claimed is:

1. A silicone composition capable of being cured by both a moisture-curing and ultraviolet curing mechanisms comprising:

(a) a reactive organosiloxane prepared by a condensation reaction of a silicone having the general formula

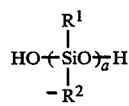

where R$^1$ and R$^2$ are each an organo group; and a is a number corresponding to a kinematic viscosity of 25–50,000 cSt, measured at 25° C., with a vinyl ether silane compound having the general formula

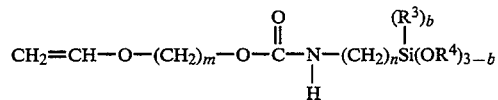

where m and n are each an integer of 1 to 5; R$^3$ and R$^4$ are each an alkyl group having 1 to 3 carbon atoms or allyl; and b is 0 or 1;

(b) 0–70 parts by weight of a silicone oil per 100 parts by weight of the silicone composition, said silicone oil having a trimethylsilyl group as an end group;

(c) an catalytic effective amount of a photopolymerization catalyst; and (d) a catalytic effective amount of a silicone moisture curing catalyst.

2. The composition of claim 1 wherein R$^1$ and R$^2$ are each independently a hydrocarbon group having 1 to 10 carbon atoms and are selected from the group consisting of alkyl, cycloalkyl, alkenyl, aryl and one of the above substituted with an inert group.

3. The composition of claim 1 wherein the silicone oil has a kinematic viscosity of 50 to 5,000 cSt, measured at 25° C.

4. The composition of claim 1 wherein the photopolymerization catalyst is an onium salt.

* * * * *